United States Patent Office 2,881,224
Patented Apr. 7, 1959

2,881,224

PREPARATION OF CHLOROALKYLBENZENE

David A. McCaulay, Chicago, Ill., and Arthur P. Lien, Highland, Ind., assignors to Standard Oil Company, Chicago, Ill., a corporation of Indiana No Drawing. Application December 26, 1956
Serial No. 630,439

4 Claims. (Cl. 260—650)

This invention relates to chloropolyalkylbenzenes and chloronaphthalenes and a method of preparation thereof.

In the chlorination of aromatic hydrocarbons it is customary to obtain a product mixture containing a variety of chlorinated aromatic hydrocarbons. The physical properties of these isomers are so close together that it is virtually impossible to produce individual isomers of high purity. Chlorobenzenes and chloronaphthalenes are of interest to the chemical industry as starting materials for the production of phenols. A demand now exists for alkylphenols having a particular structure. By the present known methods of chlorination of aromatic hydrocarbons these materials are difficult to make and therefore expensive.

An object of the invention is the preparation of chloropolyalkylbenzenes. Another object is the preparation of chloronaphthalene and chloroalkylnaphthalenes. A particular object is the preparation of monochloropolyalkylbenzenes. Another particular object is the preparation of chloropolyalkylbenzenes and chloronaphthalenes of very high purity. A further object of the invention is the preparation of chloropolyalkylbenzenes wherein the alkyl groups are substantially completely meta-oriented. Still another object is the chlorination process for the preparation of high purity chloropolyalkylbenzenes which does not require starting with a particular polyalkylbenzene. Other objects will become apparent in the course of the description of the invention.

When a polyalkylbenzene, naphthalene or alkylnapthalene containing from 1 to 4 carbon atoms in each alkyl group is treated with substantially anhydrous liquid hydrogen fluoride and boron trifluoride a complex is formed; this complex is extremely soluble in substantially anhydrous HF. The complex appears to consist of equal molecular amounts of polyalkylbenzene or napthalene or alkylnaphthalene, hydrogen fluoride and boron trifluoride. By the use of sufficient HF and $BF_3$ it is possible to take all the polyalkylbenzene or defined naphthalene into the liquid HF phase thereby forming an essentially single homogeneous phase system of liquid HF-$BF_3$ and defined hydrocarbon. A pure feed is not necessary as the complex-in-HF solution can dissolve appreciable amounts of benzene or toluene and also some paraffin hydrocarbons or cycloparaffin hydrocarbons. It is preferred to operate with a polyalkylbenzene or defined naphthalene feed which is essentially pure or one which contains amounts of non-complexible materials, such as benzene, toluene and paraffins which will be dissolved in the liquid HF phase; thus an essentially single homogeneous system is present in the reaction zone, although some gas phase may be present.

It has been discovered that chlorinated aromatic hydrocarbons do not form a complex with HF and $BF_3$. Addition of chlorine ($Cl_2$) to liquid containing dissolved complex results in the formation of a separate phase of chlorinated aromatic hydrocarbon. By the use of sufficient chlorine it is possible to convert essentially all the aromatic hydrocarbon present in the HF-$BF_3$-aromatic hydrocarbon complex to chlorinated aromatic hydrocarbon. The solubility of the chlorinated aromatic hydrocarbons in liquid HF is very low. It is possible therefore to recover substantially all the chlorinated aromatic hydrocarbon produced by simple decantation away from the liquid HF phase.

If it is desired to recover all the chlorinated aromatic hydrocarbon produced this may be accomplished very simply by washing the liquid HF phase with a non-complexible hydrocarbon, separating the solution from the liquid HF phase and separating the chlorinated aromatic hydrocarbon from the wash hydrocarbon. The wash hydrocarbon must be not only non-complexible but also not adversely effected by liquid HF and $BF_3$ under the conditions of washing. Particularly suitable wash liquids are the low boiling paraffin hydrocarbons such as butane, pentane and hexane as these may be readily separated from the chlorinated aromatic hydrocarbon product by distillation.

In the process of the invention the aromatic hydrocarbon feed is polyalkylbenzene containing at least 2 alkyl groups and not more than 4 carbon atoms in each alkyl group, or naphthalene itself or alkylnaphthalene containing not more than 4 carbon atoms in each alkyl group. The aromatic hydrocarbon feed may be prepared from a monoalkylbenzene containing from 1 to 4 carbon atoms in the alkyl group by preliminary disproportionation treatment with liquid HF and $BF_3$ to convert the monoalkylbenzene to dialkylbenzene or a mixture of dialkylbenzene and trialkylbenzene. When this is done the benzene produced in the conversion reaction may be removed from the liquid HF phase prior to the chlorination step or it may be chlorinated to chlorobenzenes in the chlorination step. Examples of suitable polyalkylbenzenes are the various xylene isomers, the various trimethylbenzene isomers, the various tetramethylbenzene isomers, pentamethylbenzene; also the various polyethylbenzenes corresponding to the above polymethylbenzenes; the various poly-n-propyl and polyisopropylbenzenes; and the various poly-n-butyl or poly-secondary-butyl or poly-t-butylbenzenes. Suitable monoalkylbenzenes are monoethylbenzene, mono-n-propylbenzene, cumene(mono-isopropylbenzene), mono-secondary-butylbenzene, mono-n-butylbenzene and mono-t-butylbenzene. Polyalkylbenzenes containing two different alkyl groups may be charged to the process; for example these might be one of the various cymenes or one of the various ethyltoluenes or t-butyltoluene. Naphthalene forms a complex with liquid HF and $BF_3$ and may be used as a charge to the process. The various monoalkylnaphthalenes and polyalkylnaphthalenes where each alkyl group contains from 1 to 4 carbon atoms may be charged to the process. The various methylnaphthalenes and ethylnaphthalenes are particularly suitable.

It is necessary that the reaction take place under substantially anhydrous conditions. The liquid hydrogen fluoride should be essentially free of water, i.e., contain not more than 2 or 3% of water. Commercial grade anhydrous hydrofluoric acid is suitable for use.

In order to maintain the complex the chlorination zone and complex forming zone must be maintained at a pressure sufficient to keep the HF in the liquid state at the particular temperature of operation.

The HF participates in the complex formation to the extent of 1 mol per mol of polyalkylbenzene. More than this amount of liquid HF is necessary because excess HF must be present to dissolve the complex formed. In general at least about 3 mols of liquid HF are present per mol of polyalkylbenzene charged. (Remarks made with respect to polyalkylbenzene in the complex are equally applicable to naphthalene or alkylnaphthalene in the complex.) More than this minimum amount of liquid HF may be used; for instance, 50 mols per mol of polyalkylbenzene. In general, the liquid HF usage is between about 8 and 15 mols per mol of polyalkylbenzene.

Boron trifluoride participates in the complex formation to the extent of 1 mol per mol of polyalkylbenzene. In order to attain the desired essentially single homogeneous system it is necessary to use at least about 1 mol of $BF_3$ per mol of polyalkylbenzene charged. The complex solutizes aromatic hydrocarbons into the liquid HF so that a little less than the theoretical amount of $BF_3$ may be used and still attain the single homogeneous system. In order to keep essentially all of the polyalkylbenzene in the complexed state more than 1 mol of $BF_3$ is necessary. The amount of excess $BF_3$ used will be dependent in part upon the type of material charged and the temperature maintained in the chlorination zone. In general, about 1.5 mols of $BF_3$ per mol of polyalkylbenzene represents a practical maximum. Under special conditions more than this amount can be used without any harmful effect on the product distribution.

In the chlorination process the particular polyalkylbenzene or alkylnaphthalene is contacted with the desired amount of $BF_3$ and liquid HF to form an essentially single phase homogeneous system of liquid HF, $BF_3$ and defined hydrocarbon. Chlorine is then added to the homogeneous system. The chlorine reacts with nuclear carbon atoms to produce a chlorinated aromatic hydrocarbon and hydrogen chloride by-product. The chlorinated aromatic hydrocarbon is not complexible and is of very low solubility in liquid HF. When enough chlorine has been added to produce chlorinated aromatic hydrocarbons in an amount in excess of solubility in the liquid HF system a separate liquid phase of chlorinated aromatic hydrocarbon appears. This separate phase may be separated by decantation or other methods dependent upon gravity differences from the liquid HF system. In general, between about 0.2 and 2 mols of chlorine are added where dialkylbenzene is the feed. The chlorination reaction proceeds extremely rapidly. The chlorination zone may be agitated by motor driven means or the chlorine gas itself may be used as the agitation medium. This is of no consequence in the chlorination reaction because of the speed with which the chlorine joins the aromatic nucleus. The reaction is exothermic and means should be provided to keep the reaction zone at the desired temperature. In general, the chlorination zone is maintained at a temperature between about $-20°$ C. and $+35°$ C. The particular operating temperature will be dependent somewhat upon the materials charged. However, a particularly suitable operating range of temperatures is between about $5°$ and $20°$ C.

The operating temperature of the chlorination zone is of considerable importance when the desired chlorinated aromatic hydrocarbon has alkyl groups which are not meta-oriented with respect to each other. For example, when it is desired to chlorinate para-xylene or pseudocumene the temperature of the chlorination zone should be maintained at such a point that there is no substantial conversion of the para-xylene to meta-xylene or pseudocumene to mesitylene. When operating with polyalkylbenzenes or alkylnaphthalenes containing isopropyl, secondary-butyl or t-butyl groups it is necessary to control the temperature in order to avoid disproportionation reactions; for example, di-t-butylbenzene proceeds extremely rapidly to a mixture of benzene, di-t-butylbenzene and tri-t-butylbenzene. When operating with di-t-butylbenzene the chlorination reaction should be carried out at temperatures below even $-20°$ C. It is also to be understood that during the initial step of forming the complex in HF solution the temperature of formation and the holding time of the complex in HF solution prior to chlorination should take into account the possibility of the various conversion reactions which can take place in this HF-$BF_3$ system. It is not deemed necessary to set out the conditions of temperature and time for each polyalkylbenzene or alkylnaphthalene because these conditions are set out in many patents and publications by Messrs. Lien and McCaulay.

When it is desired to produce a high purity product a single isomer should be charged to the chlorination zone for example, para-xylene should be charged when it is desired to obtain essentially pure 2-chloro-1,4-dimethylbenzene. Meta-xylene produces essentially only 4-chloro-1,3-dimethylbenzene even though theoretically 2-chloro-1,3-dimethylbenzene could also be produced.

The process of the instant invention can be utilized to produce chloropolyalkylbenzenes where the alkyl groups are completely meta-oriented from a charge stock which is (a) a polyalkylbenzene isomer which is not meta-oriented (b) a mixture of polyalkylbenzenes which are not meta-oriented and (c) a mixture of polyalkylbenzenes which are not meta-oriented with polyalkylbenzene which is completely meta-oriented. Examples of such feeds are ortho and/or para-xylene; a mixture of the three xylene isomers; psuedocumene; a mixture of all three trimethylbenzene isomers; durene; a mixture of all the tetramethylbenzene isomers; a mixture of the various ethyltoluenes. Particularly suitable are those polyalkylbenzenes containing 1 or more isopropyl, secondary-butyl or t-butyl groups; examples of these are cymenes, t-butyltoluenes and diisopropylbenzenes. The term completely meta-oriented is to be understood as a molecule containing the maximum number of meta-oriented positions for the particular number of alkyl groups present. To illustrate, the following polyalkylbenzenes are completely meta-oriented: 1,3-dialkylbenzene, 1,3,5-trialkylbenzene and 1,2,3,5-tetraalkylbenzene.

When it is desired to charge a mixture of polyalkylbenzene isomers to the process in order ot obtain a chloropolyalkylbenzene wherein the alkyl groups are substantially completely meta-oriented, the isomeric mixture is contacted with HF and $BF_3$ in an essentially single phase homogeneous system at a temperature and time relationship such that the various isomers are converted to the completely meta-oriented isomer. For example a mixture of xylenes converts to a complex containing essentially only meta-xylene. A mixture of trimethylbenzenes is converted to a complex containing essentially only mesitylene. Also monoalkylbenzenes may be treated to produce essentially only meta-dialkylbenzene and 1,3,5-trialkylbenzene. The conditions needed for these conversions are set out in detail in the various patents and publications of Messrs. Lien and McCaulay.

In the variation of the process wherein a mixture of isomers is converted to the meta-oriented isomer the conversion reaction may be carried out in batch fashion in a vessel and the chlorination reaction carried out subsequently in that same vessel. The amounts of HF and $BF_3$ needed to carry out the conversion are identical with those prescribed for the chlorination reaction. Of course, it may be necessary to adjust the temperature of the complex-in-HF solution prior to the addition of chlorine. On the other hand the conversion reaction in a continuous process may be carried out in 1 vessel and the complex-in-HF solution transferred to the chlorination zone in the second or subsequent vessel. Many variations of the process will be readily adaptable by those who are knowledgeable in the HF and $BF_3$ treating of aromatic hydrocarbons art.

The results obtainable by the process are illustrated by the chlorination of meta-xylene.

*Example*

The reaction zone in the example consisted of an autoclave provided with a mechanical stirrer. 400 ml. of commercial grade anhydrous acid was charged to the autoclave. Meta-xylene containing only about 2% of other xylene impurties was then charged in an amount of 171 grams (1.6 mols). Commercial grade cylinder BF$_3$ was charged to the reactor in an amount of 3.37 mols. The contents of the autoclave were brought to 3° C. and over a period of 10 minutes 55 grams (0.82 mol) of chlorine gas were added to the autoclave. Almost immediately after addition of chlorine the temperature in the autoclave rose to 20° C. and remained there during the time of addition of chlorine. After the chlorine addition was ended the temperature of the contents of the autoclave fell to 3° C. The contents of the autoclave were then stirred for 4 hours at this temperature. The entire product was withdrawn from the autoclave into a vessel filled with ice; during the removal it was evident that two separate liquid phases had been present in the autoclave. The upper liquid layer was decanted from the lower aqueous layer. After neutralization with aqueous ammonia and drying, the product liquid was carefully distilled into close boiling fractions. The close boiling fractions were analyzed by both infrared techniques and gas chromatography. The product distribution obtained in this test is set out below.

| Product mixture: | Mole percent |
|---|---|
| m-Xylene | 62 |
| 4-chloro-1,3-dimethylbenzene | 18 |
| 4,6-dichloro-1,3-dimethylbenzene | 20 |
| 2,4-dichloro-1,3-dimethylbenzene | |
| | 100 |

The monochloro xylene product was, within the error of this analytical procedure, pure 4-chloro-1,3-dimethylbenzene. The dichloroxylene product contained only the two isomers. The physical properties of these two isomers are so similar that an exact distribution between the two could not be obtained; it appears that this fraction contained about 40 mol percent of the 4,6-dichloro-1,3-dimethylbenzene and about 60 mol percent of the 2,4-dichloro-1,3-dimethylbenzene.

Thus having described the invention, what is claimed is:

1. A process for making 4-chloro-1,3-dimethylbenzene which comprises, under substantially anhydrous conditions, (a) contacting essentially pure m-xylene with at least about 3 moles of liquid HF and at least 1 mole of BF$_3$ per mole of m-xylene, respectively, to form an essentially single phase homogeneous system, (b) at a temperature between about −20° C. and +35° C., adding chlorine to said system, (c) separating a chloroxylene mixture phase from a liquid HF phase and (d) separating a mono-chloroxylene product consisting essentially of 4-chloro-1,3-dimethylbenzene from said chloroxylene mixture.

2. The process of claim 1 wherein said chlorine is added in an amount between about 0.2 and 2 moles per mole of m-xylene.

3. The process of claim 1 wherein said HF usage is between about 8 and 15 moles per mole of m-xylene.

4. The process of claim 1 wherein said BF$_3$ usage is about 1.5 moles per mole of m-xylene.

References Cited in the file of this patent
UNITED STATES PATENTS

| 2,737,499 | Grubb | Mar. 6, 1956 |

FOREIGN PATENTS

| 825,397 | Germany | Dec. 17, 1951 |